United States Patent [15] 3,676,376
Svoboda et al. [45] July 11, 1972

[54] LOW FLAME SPREAD POLYURETHANE FOAM CONTAINING BROMINE-CONTAINING POLYESTER RESIN

[72] Inventors: Glenn R. Svoboda; Ronald W. Reineck, both of Grafton, Wis.

[73] Assignee: Freeman Chemical Corporation, Port Washington, Wis.

[22] Filed: Jan. 4, 1971

[21] Appl. No.: 103,913

Related U.S. Application Data

[63] Continuation-in-part of Ser. No. 747,829, July 26, 1968, abandoned.

[52] U.S. Cl. .............. 260/2.5 AV, 260/2.5 AJ, 260/2.5 AN, 260/2.5 AP, 260/2.5 AS, 260/75 H, 260/75 NK
[51] Int. Cl. ................................................. C08g 22/44
[58] Field of Search .................. 260/2.5 AN, 2.5 AV, 2.5 AJ, 260/75 H, 75 NK, 2.5 AP, 2.5 AS

[56] References Cited

UNITED STATES PATENTS

| | | |
|---|---|---|
| 3,536,782 | 10/1970 | Toggweiler et al. .................. 260/2.5 |
| 3,285,995 | 11/1966 | Nametz et al. ......................... 260/865 |
| 3,057,824 | 10/1962 | Le Bras et al. ......................... 260/2.5 |
| 3,058,941 | 10/1962 | Birum ................................... 260/2.5 |
| 3,042,666 | 7/1962 | Gentles ................................. 260/2.5 |

*Primary Examiner*—Donald E. Czaja
*Assistant Examiner*—Eugene C. Rzucidlo
*Attorney*—Harry B. Keck and George E. Manias

[57] ABSTRACT

A low-flame spread rating polyurethane foam includes as one of its polyol ingredients saturated polyester composition of low acid value having 20 to 30 percent bromine by weight and an —OH value of 350–550 formed from
 a. tetrabromophthalic anhydride or acid;
 b. an aliphatic dicarboxylic acid;
 c. a polyol;
 d. an aliphatic diol.

The polyester preferably has a viscosity less than 500,000 centipoises at 25° C. In such low-flame spread forms, the polyester is combined with prepolymers of a polyether polyol and a polyisocyanate, preferably polymethylene polypehnylene polyisocyanate.

10 Claims, No Drawings

LOW FLAME SPREAD POLYURETHANE FOAM CONTAINING BROMINE-CONTAINING POLYESTER RESIN

CROSS-REFERENCES TO RELATED APPLICATIONS

This application is a continuation-in-part of our copending application Ser. No. 747,829 filed on July 26, 1968 and assigned to the assignee of the present application, now abandoned.

BACKGROUND OF THE INVENTION

1. Field of the Invention

This invention concerns low flame spread polyurethane foam products.

2. Description of the Prior Art

Flame retardant polyurethane foam products have been proposed wherein the flame retardance is achieved by various additives. Prior to the present invention, none of the available pour-in-place polyurethane foam products had achieved a flame spread index of 25 or less in the ASTM test method for fire hazard classification of building materials, ASTM E-84. Polyurethane foam products can be prepared by combining polyisocyanates and resinous materials having active hydrogen groups in the presence of suitable catalysts, surfactants and blowing agents. The polyisocyanate ingredient frequently is employed in the form of a prepolymer. Polyester resins are well known as a resinous product capable of providing the required active hydrogen groups for reaction with an isocyanate.

Because many building codes in the United States preclude the use of materials in building construction unless they are rated at 25 flame spread or less in the ASTM E-84 test, supra, the commercial significance of such ratings is clear, to wit, a flame spread index of 25 or less in the ASTM E-84 test is an absolute, albeit arbitrary, requirement for a marketable building product in many areas of the country.

SUMMARY OF THE INVENTION

The present polyurethane foam achieves a flame spread rating less than 25 in the ASTM E-84 test, supra. The polyurethane foam employs a polyisocyanate, which may be in whole or in part a prepolymer or semi-prepolymer;
  a suitable catalyst;
  a surfactant;
  a blowing agent;
  a bromine-containing polyester resin;
  a halogen-containing organo-phosphorus composition.

The bromine-containing polyester resin has a low acid value, less than 2, has a —OH value of 350-550 and has a bromine content of 20-30 percent by weight. The polyester preferably has a viscosity less than 500,000 centipoises at 25° C. The polyester is produced by the polyesterification reaction of:

a tetrabromophthalic anhydride or acid;
  b. an aliphatic dicarboxylic acid having a molecular weight of 130–300 and typically including adipic acid, azelaic acid and sebacic acid;
  c. an aliphatic polyol, typically a triol, such as trimethylol propane;
  d an aliphatic diol having the formula $$HOCH_2(CH_2)_nCH_2OH$$

wherein $n$ is an integer from 3 through 10.

A preferred aliphatic diol is 1,6-hexane diol.

The polyol is preferably a triol such as trimethylol propane, trimethylol ethane, tris hydroxy propyl glycerine, and, in general, any tri-hydroxyl-functional aliphatic or alicyclic hydrocarbon or ether. Tetrols may be employed as the polyol such as alkylene oxide adducts of pentaerythritol or of methyl glucoside. The alkylene oxide adducts of sorbitol may be employed as a representative six-hydroxyl-functional hydrocarbons. The hydroxyl content of the polyols should be stoichiometrically balanced to correspond with the available —NCO groups in the polyisocyanate ingredients.

The polyisocyanate for the present purposes is an organic polyisocyanate and preferably is a polymeric organic polyisocyanate having a —NCO value of 20 to 34. The polyisocyanate may be a prepolymer or a semi-prepolymer (also known sometimes as a partial prepolymer or a quasi-prepolymer). The preferred polyisocyanate is a prepolymer formed by the reaction of a polymethylene polyphenylene polyisocyanate and a polyether polyol, preferably an alkylene oxide adduct of a polyol such as methyl glucoside, sorbitol, sucrose.

Surfactants are well known in the polyurethane art and include a variety of silicone fluids compositions which have an influence on the cell size and uniformity in the resulting foam.

Catalysts likewise are well known in the polyurethane foam art, but preferred catalysts for the present foam are the amine catalysts such as triethylene diamine and TMBD (N,N,N′,N′-tetramethylbutane diamine). The organo-tin catalysts are effective but for typical foaming applications in building materials, they are too rapid. Hence the slower-acting amine-catalysts are normally employed.

Blowing agents are usually vaporizable liquid halogenated hydrocarbons such as trichloro-fluoro-ethane, sold commercially as FREON-11.

The halogen-containing organo-phosphorus composition may include tris-chloro-propyl phosphite, tris-dichloro propyl phosphite, tris-bromo propyl phosphite or

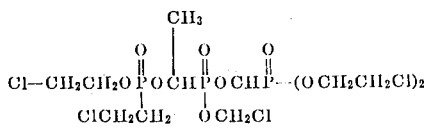

all of which are commercially available for use as synergistic flame retardant additives for polyurethane foam products. The material illustrated in structural formula is available under the trade name Phosgard C-22-R, and is a preferred synergistic flame retardant additive for the present polyurethane foam.

DESCRIPTION OF THE PREFERRED EMBODIMENT(S)

The Present Polyester Resin

The following ingredients are combined to produce the polyester resin of this invention;

a. 2.5–3 mols tetrabromophthalic anhydride or acid;
  b. 4–5 mols aliphatic dicarboxylic acid such as adipic acid;
  c. 1–2 mols aliphatic diol such as 1,6-hexane diol;
  d. 10–15 mols of aliphatic polyol such as trimethylol propane.

The ingredients are combined and heated for about 3 hours at about 200° C until the acid value diminishes to a low level, i.e., below 2, which indicates substantially complete consumption of the carboxylic groups which are contributed by the dicarboxylic acids and anhydride ingredients.

EXAMPLE

The following ingredients were charged to a round bottom glass flask:

| | | |
|---|---|---|
| trimethylol propane | 1608 | grams |
| 1,6-hexane diol | 177 | grams |
| adipic acid | 671.6 | grams |
| tetrabromophthalic anhydride | 1252.8 | grams |
| Total | 3709.4 | grams |

The ingredients were heated from room temperature to about 200° C over a period of about 4.5 hours and held at 200° C for about three hours until the acid value below 1.0 was observed. The viscosity of the product was 180,000 centipoises. The polyester contained 24 per cent bromine by weight and exhibited an —OH value of 395.

Preparation of Foam

A polyisocyanate prepolymer was prepared by combining the following ingredients under reactive conditions for isocyanate groups and hydroxyl groups:
79.88 parts by weight polymethylene polyphenylene polyisocyanate;
1.12 parts by weight of silicone fluid as a surfactant (specifically Union Carbide Corporation silicone fluid L–5310);
16.50 parts by weight Phosgard C–22–R (described supra) which is a halogen-containing organo-phosphorus composition of high molecular weight;
2.50 parts by weight methyl-glucoside-based-polyether, specifically poly-G–560DM, sold by Olin Corporation.
The polyisocyanate prepolymer had an —NCO value of 23.4.

The resinous component was prepared by combining 70.9 parts by weight of the polyester resin just described; 26.8 parts by weight tri-chloro-fluoro ethane as the blowing agent.
1.4 parts by weight silicone fluid (specifically Union Carbide Corporation silicone fluid L–5310); 0.7 parts by weight triethylene diamine solution (33 per cent triethylene diamine in dipropylene glycol solvent) which is commercially available as DABCO–33LV; and 0.2 parts by weight TMBD (N,N,N′N′-tetramethylbutane diamine). The triethylene diamine and the TMBD both function as amine-catalysts in this formulation.

93.4 parts by weight of the described polyisocyanate prepolymer are combined with 100 parts by weight of the described resinous component, mixed and allowed to rise. The resulting blocks of polyurethane foam had a density of 2.3 pounds per cubic foot and a closed cell content greater than 90 per cent.

When subjected to evaluation according to the test method for fire hazard classification of building materials, ASTM E–84, the resulting polyurethane foam had a flame spread index of 20.

We claim:

1. A low flame spread polyurethane foam formed by reacting
   A. an organic polyisocyanate having an —NCO value of 20–30; and
   B. a polyester having an -OH value of 350–550 and a bromine content of 20–30 weight per cent comprising the polyesterification reaction product of
      a. tetrabromophthalic acid or anhydride;
      b. an aliphatic dicarboxylic acid having a molecular weight of 130–300;
      c. polyol selected from the class consisting of aliphatic and alicyclic hydrocarbons and ethers having at least three hydroxyl groups;
      d. an aliphatic diol having the formula
         $$HOCH_2(CH_2)_nCH_2OH$$
   wherein $n$ is an integer from 3 to 10;
   the reaction being carried out in the presence of
   C. a halogen-containing organo-phosphorus fire retardant additive; and
   D. a blowing agent.

2. The polyurethane foam of claim 1 wherein the said polyester has a viscosity of less than 500,000 centipoises at 25° C.

3. The polyurethane foam of claim 1 wherein the said aliphatic dicarboxylic acid is adipic acid.

4. The polyurethane foam of claim 1 wherein the said diol is 1,6-hexane diol.

5. The polyurethane foam of claim 1 wherein the said polyol is a triol.

6. The polyurethane of claim 1 wherein the said polyester comprises the polyesterification reaction product of
   10–15 mols of trimethylol propane;
   1–2 mols of 1,6-hexane diol;
   4–5 mols of adipic acid;
   2.5–3 mols of tetrabromophthalic acid or anhydride.

7. The polyurethane foam of claim 1 wherein the said polyester has an acid value less than 2.

8. The polyurethane foam of claim 1 wherein the said polyisocyanate is a prepolymer formed by reacting polymethylene polyphenylene polyisocyanate with polyether polyol.

9. The polyurethane foam of claim 8 wherein the said polyether polyol is the alkylene oxide adduct of methyl glucoside.

10. The polyurethane foam of claim 1 having a flame spread index less than 25 in the ASTM E–84 test.

* * * * *